Figure 1:
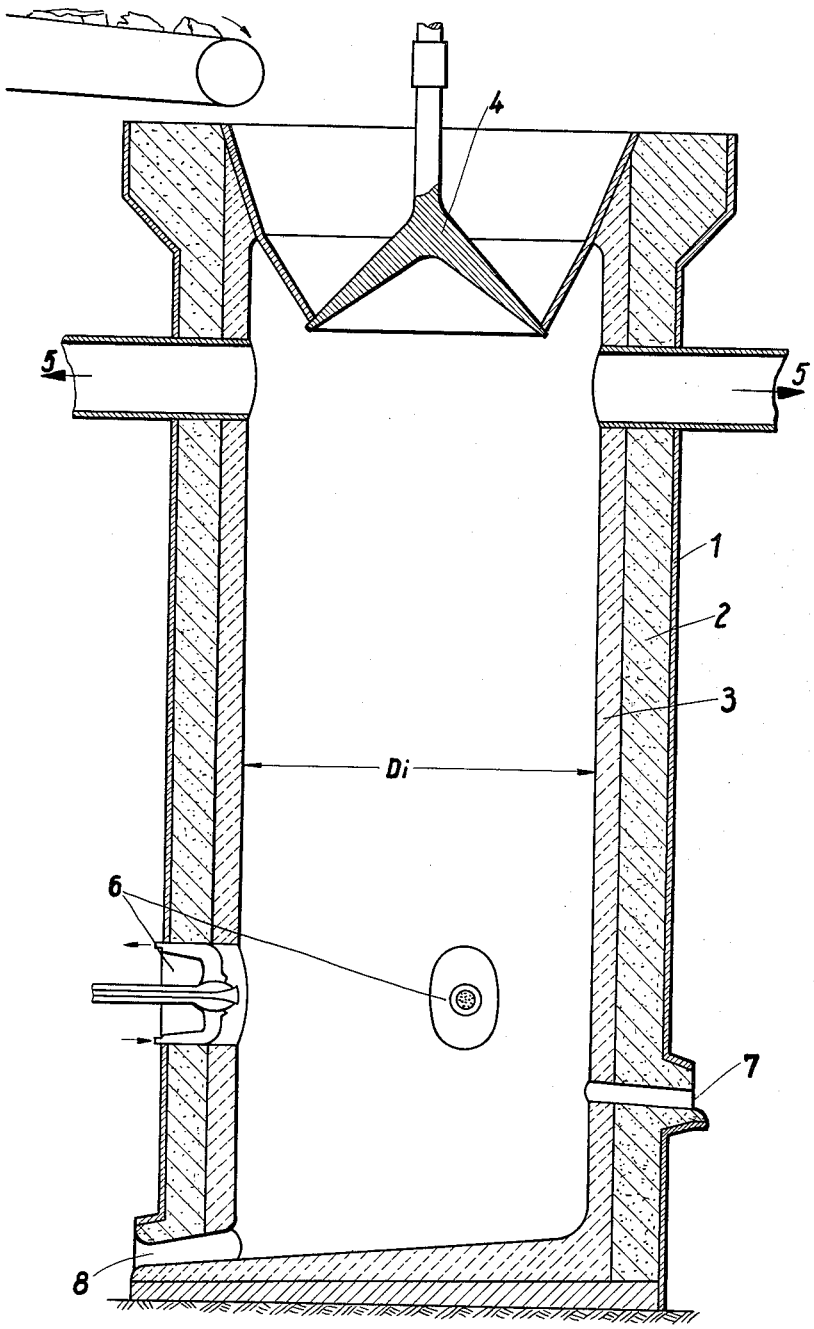

Feb. 1, 1966        H. W. BALSTER        3,232,595
SHAFT TYPE FURNACE FOR SMELTING SCRAP AND PRODUCING STEEL
Filed Dec. 4, 1961        2 Sheets-Sheet 1

Inventor:
HEINZ W. BALSTER
By Burgess, Dinklage & Sprung
ATTORNEYS

_United States Patent Office_ 3,232,595
Patented Feb. 1, 1966

3,232,595
SHAFT TYPE FURNACE FOR SMELTING
SCRAP AND PRODUCING STEEL
Heinz W. Balster, Dusseldorf, Germany, assignor to
Rheinstahl Huttenwerke Aktiengesellschaft, Essen,
Germany
Filed Dec. 4, 1961, Ser. No. 156,865
Claims priority, application Germany, Dec. 3, 1960,
R 29,221; Jan. 12, 1961, R 29,445
2 Claims. (Cl. 266—25)

This invention relates to a novel furnace and process for producing steel, as, for example, from scrap. More particularly, this invention relates to a blast furnace apparatus and process for melting scrap steel using an oxygen-fuel mixture as the sole heat source.

When steel scrap is used as a raw material in a steel producing furnace such as, for example, in a Siemens-Martin furnace, an open-hearth furnace, or an electric-arc furnace, it is common practice to add the raw steel scrap to the furnace in a solid condition for the melting. In order to increase production rates of this type of furnace, it is desirous to shorten the time required to charge the furnace with the solid pieces of scrap. However, as the size of this type furnace increases, greater amounts of steel scrap are required to charge the furnaces thereby increasing the charging time.

In one known method of charging with steel scrap, two charging cranes operate simultaneously to fill a single furnace in as short a time as possible with the specified volume of scrap. In another known method a charging machine as, for example, a scrap bucket elevator is used to introduce and empty scrap buckets filled from large scrap holders into the furnace. In some cases a large scrap holder may be located in the immediate vicinity of the furnace and the charging boxes may be filled with scrap steel from the adjacent large scrap holder.

These methods of charging furnaces with scrap steel are time-consuming, cumbersome, and expensive and thus have presented an obstacle in efforts to increase the capacity of these steel-producing furnaces.

In this regard it might also be pointed out that melted blown metal from a hot blast spherical furnace may be used instead of steel scrap. In such a case the melted metal is fed from the spherical furnace into a Siemens-Martin or similar type furnace. However, this process is uneconomical because of the high coke consumption in producing the liquid crude iron and also, because of the composition of the liquid iron thus obtained, a costly metallurgical refining process is required before it may be processed into steel. Therefore, this process is not widely used.

It is the general object of the present invention to avoid and overcome the foregoing and other difficulties of and objections to prior art practices by the provision of a separate furnace for melting steel scrap and for feeding the melted scrap from such furnace into a steel-producing furnace which requires steel scrap as a raw material.

Another object of the present invention is to provide an improved method for providing steel scrap to a steel-producing furnace.

Still another object of the present invention is the provision of a furnace for melting steel scrap or for producing steel wherein the furnace is sealed from the surrounding atmosphere and fuel is burned within the furnace to provide the required heat for melting the scrap.

Yet another object of the present invention is the provision of a furnace and a method for producing steel from steel scrap and iron ore.

The aforesaid objects of the present invention and other objects which will become apparent as the description proceeds are achieved by providing a furnace for melting steel scrap or iron ore wherein the steel scrap or iron ore or a combination of both is introduced into a furnace sealed from the atmosphere and burners are provided on the furnace to supply an oxygen-fuel mixture for combustion within the furnace whereby the heat generated by the combustion of the fuel serves as the sole source of heat supply within the furnace to melt the scrap or iron ore.

Figure 2:
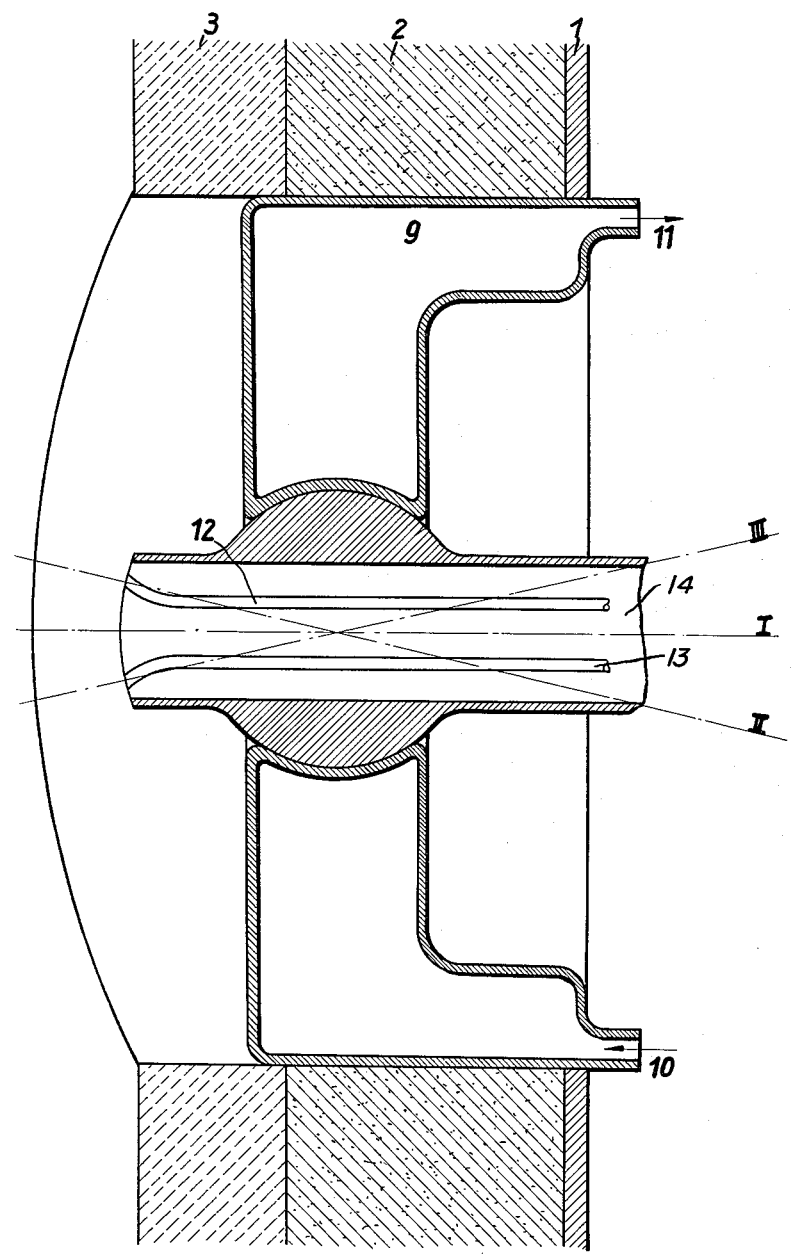

For better understanding of the present invention reference should be had to the accompanying drawings, wherein like numerals of reference indicate similar parts throughout the several views and wherein:

FIG. 1 is a schematic vertical section view of a furnace arrangement in accordance with the present invention, and FIG. 2 is an enlarged schematic vertical sectional view showing details of a burner suitable for use in the furnace of the invention.

With specific reference to the form of the present invention illustrated in the drawings and referring particularly to FIG. 1, the improved furnace of the present invention consists of a steel outer casing 1, an intermediate refractory lining 2 constructed, for example of dolomite brick, and an inner wear-resistant lining 3 covering the inside surfaces of the lining 2.

To permit access to the furnace for charging with steel scrap a closure device in the form of a rotatable conical bell 4 is provided in the upper portion of the furnace. By lowering the conical bell 4 the scrap steel which is supplied to a hopper 4a by the conveyor 4b will fall into the furnace. When the conical bell 4 is displaced to its upper position as viewed in FIG. 1, it will prevent the admission or escape of gases from the furnace through the charging opening.

In the lower part of the furnace, and most preferably in the lower third of the furnace, there are provided a plurality of burners 6 (only one of which is shown) which are used to supply a mixture of fuel and oxygen to the furnace which, on combustion of the fuel in the furnace, will provide the heat for melting the steel scrap. Thus, in accordance with the invention, the burner-fed oxygen-fuel mixture is the sole source of heat for the furnace. The waste gases generated during the melting are discharged through a waste gas conduit 5 while the slag is removed from the furnace slag outlet 7. The melted steel is tapped from the furnace through tap outlet 8.

The burner 6, as shown in FIG. 2, is positioned in an opening in the furnace wall and preferably comprises a plurality of fuel-oxygen conduits 12 and 13 located in a nozzle 14. The nozzle 14 is made of a forged high-quality copper alloy. Each conduit 12 and 13 introduces into the furnace a mixture of oxygen and gaseous fuel, such as $CH_4$ for example, which is ignited and burns within the furnace with a very hot flame (4000 to 5000° C.). At this temperature the steel scrap is melted very quickly and it is maintained in this liquid state at the bottom of the furnace. Instead of a gaseous fuel, other fluid form fuel, as for example oil, may also be used as a fuel.

The nozzles 14 may be mounted rigidly in the furnace walls or, preferably, they may be mounted for pivotal movement as shown in FIG. 2.

Means are provided for cooling the burner such as a jacket casing 9 around the nozzle 14 which has an inlet 10 and outlet 11 for supplying and discharging steam or another cooling medium. The nozzle 14 is pivotally seated in the jacket casing 9. The fuel-oxygen conduits 12 and 13 are outwardly curved at their ends so as to diverge from the longitudinal axis of the nozzle at their discharge ends into the furnace. Preferably the oxygen and fuel conduits are curved so that they diverge at an angle of approximately 20° relative to the longitudinal axis of the nozzles 14 to disperse the fuel and oxygen within the furnace.

Thus by heating and melting the steel scrap in a furnace such as described above and using the melted scrap in a steel producing furnace such as a Siemens-Martin furnace since the Siemens-Martin furnace may be charged faster with liquid metal than with an equivalent amount of solid scrap. Further the furnace of the invention provides a construction whereby steel scrap may be introduced into the blast furnace in the shortest possible time, yet in an efficient manner and the charged scrap steel may be effectively treated in the furnace and recovered therefrom at higher capacity since no time is lost between the tapping off of already smelted steel and the further addition of scrap steel to the furnace.

It is to be understood that when the term "Siemens-Martin" furnace is used in this description, it is intended to represent as well any other steel producing furnace, such as, for example, an open hearth furnace or an electric arc furnace.

When the furnace of the present invention is charged with steel scrap, the nozzles 14 may be tilted downwardly (such as, for example, to position III in FIG. 2) in order to form a pool of liquid metal at the lower part of the furnace. As soon as the necessary liquid pool has been formed, the nozzles 14 can be returned to their normal working positions. Also the nozzles may be arranged to slide into the furnace and to be retracted therefrom.

Since the hot gases from the combustion of the fuel within the furnace will rise to exit through the conduit 5, these rising gases will heat the newly added steel scrap at the upper portion of the furnace such that the steel scrap, upon reaching a lower elevation where the nozzles are located, will already have reached the melting temperature of the scrap.

When charging the furnace with scrap, slag formers such as $CaCO_3$, $CaO$ or $CaF$ may be added to the furnace along with the scrap. As the scrap melts, the liquid steel will collect in the lower portion of the furnace, and the liquid slag, being lighter in weight than the liquid steel, will settle on top of the pool of liquid steel. This slag and the liquid steel will be drawn off at specific time intervals through the conduits 7 and 8, respectively. If desired, the liquid steel may be discharged continuously from the furnace. Continuous discharge is of particular significance if the steel from the furnace is to be processed into finished steel instead of being fed to a Siemens-Martin type furnace. In such a case the steel may be conducted from the furnace into an intermediate ladle or heated container, where it will be exposed to further metallurgical treatment, particularly deoxidizing or alloying. Subsequently thereto, the steel may be cast in a customary manner or led to a continuous casting plant for making ingots, billets or the like.

Instead of providing an intermediate ladle or heated container, the furnace of the present invention may be adapted to produce steel in a final form not requiring further treatment. In such a case the liquid steel should remain at the bottom of the furnace a sufficient length of time to insure that it will react with the slag. In such a furnace it is preferable to provide burner nozzles 14 at several different elevations for melting the steel scrap. The nozzles located at the lower elevation may be tilted downwardly to supply the heat necessary for refining, alloying, or other metallurgical treatment.

In cases where a rapid decarburization is required, it is possible to shut off the fuel supply to the nozzles 14 and refine with oxygen. Air from the surrounding atmosphere is prevented from entering the furnace as such air would adversely affect the process. Therefore, the furnace is required to be sealed to prevent atmospheric air from entering the furnace.

Since the size of the furnace is generally quite large with a view to the uniform passage of the scrap and the high capacity desired, the pressure resulting from the reaction gases and combustion gases will be comparatively small. An opening may be provided in the furnace for introducing into the furnace any additives or alloying elements. Also, an opening may be provided just above the highest level of the slag formation for drawing off samples.

Instead of using steel scrap exclusively as a raw material in the furnace of the present invention, iron ore, preferably in the form of pellets may also be used in combination with the steel scrap or, in some cases, iron ore may be used exclusively. The iron ore introduced into the furnace is directly reduced. A combustible mixture consisting mainly of oxygen and fuel, such as for example $CH_4$, is introduced into the furnace and regulated as required. In order to accelerate the reduction of the iron ore, hydrogen or hydrogen-containing gas may be used additionally. In such a case, the combustion may be regulated so that only carbon dioxide or a preponderance of carbon dioxide is formed as a product of combustion. In this way it is possible to simultaneously perform the function of reduction while creating the heat necessary to maintain the reduced metal in a liquid state. Particularly the production of steel having a very low carbon-content is possible since in the reactions which take place, only a comparatively small quantity of carbon will get into the reduced iron unless of course excess carbon is intentionally added. In order to produce high quality steel free from carbon, it is necessary to provide sufficient hydrogen to bind any residual oxygen and also to react with any oxygen derived from $CO_2$ in the reaction $CO_2 + 2H \rightarrow CO + H_2O$ as well as also sufficient hydrogen to complete the reaction $FeO + H_2 \rightarrow H_2O + Fe$.

Slag formers may be introduced into the furnace as required. This may be done in the conventional manner as by adding pelleted material into which the slag formers are wholly or partially incorporated. However, since this method would reduce the surface area of the slag former, it is preferable to introduce the slag formers separately into the furnace. These slag formers are preferably introduced into the lower part of the furnace at a point where the reduced iron starts to become a liquid. Additives such as lime, for example, may be blown or injected into the furnace according to known methods.

The removal of harmful constituents, such as phosphorous and sulfur, may be accomplished by the means used therefor in other steel-making processes.

In order to aid and intensify the reaction between the slag and the pool of liquid metal, the burner nozzles 14 may be tilted downwardly in order that the gases issuing from the nozzles will impinge on the liquid metal to thereby agitate the slag and liquid metal.

The waste gases discharging from the furnace after the iron ore has been reduced, will consist mainly of carbon dioxide and steam. These waste gases may be discharged into the atmosphere without requiring any purification thereby eliminating the necessity and the cost for purification equipment while at the same time making the furnace easier to operate.

Thus it is possible to achieve a substantial economy by making steel directly from iron ore in a single furnace as above described, thereby eliminating the necessity for all of the additional equipment customarily used in the present day known methods of making steel.

In the furnace of the present invention, the hot gases of combustion rise within the furnace as the scrap or iron ore moves downwardly. Thus there is a counterflow movement established which increases the heating efficiency and reduces heat consumption.

While in accordance with the patent statutes one best known embodiment of the present invention has been illustrated and described in detail, it is to be particularly understood that the invention is not limited thereto or thereby and that the invention may be varied in construction within the scope of the claims.

OPERATING A SHAFT TYPE FURNACE FOR SCRAP MELTING

Any commercial scrap can be used which will be introduced into the furnace by means of a conveyor. Therefore it is advisable to first cut the scrap into pieces.

At the beginning the furnace is only charged with scrap up to a height of about 4 feet to 6½ feet and the scrap is heated by means of the known oxygen gas burners or oxygen oil burners and melted. This end is easily attained, as the known oxygen gas or oxygen oil burners reach flame temperatures lying about 500 to 800 degrees C. above the melting point of the steel.

As can be seen from the drawing the burners are movably arranged and, if necessary, can be swivelled upwards or downwards and also laterally.

It must be seen to it that a very short but an intensive flame is obtained by the oxygen gas or oxygen oil burner respectively.

As soon as a corresponding quantity of liquid steel has gathered in the hearth, further quantities of scrap are charged from above, so that finally the whole furnace cavity is filled with scrap.

The charging of scrap is carried out at the top by means of a rotatable conical bell of the same design as known by various blast furnace constructions.

If necessary, additions, such as lime, limestone, fluorspar etc. are added to execute the metallurgical reactions necessary for the removal of the detrimental accompanying elements contained in the steel being produced.

As soon as a certain quantity of liquid steel has collected in the hearth of the furnace deoxidizers, such as ferromanganese, ferrosilicon etc. of a small-sized quantity are added to the liquid steel shortly before the run-off of the steel.

The final deoxidation by means of aluminum is appropriately done in the ladle.

Of course it will be possible to produce in the usual manner rimmed steels according to this process.

The melting temperature range and the time required for melting are dependent on the heat available in the shaft type furnace. If sufficient heat is produced through the corresponding oxygen fuel burners, it should be possible for a furnace having a 6 meter hearth diameter to produce 1000 metric tons and more of steel per day.

The tapping of steel is either continuously done or in certain intervals. The run-off of the slag is appropriately effected through a slag hole which is provided at a certain height of the furnace.

*Example I.—Scrap melting.*

In a furnace as shown in FIGURE 1 having a diameter of 2 m. first 3000 kg. of a steel scrap were charged until the scrap filled the bottom of the furnace to a height of about 1 m. The average composition of the scrap was:

| | |
|---|---|
| C | 0.1–0.4 |
| Mn | ca. 0.5 |
| Si | ca. 0.25 |
| P | 0.04 |
| S | 0.05 |

The flames of 3 burners of the oxygen gas type were directed on the scrap with a temperature of about 2200° C., thus lying about 700° C. above the melting point of the steel scrap. The ratio of fuel to oxygen was 1 to 1.3.

After 30 minutes the scrap was melted and further scrap was continuously introduced into the furnace and thereafter the burners were turned higher. Finally the whole furnace shaft was filled with scrap. After the scrap was melted to such an extent that the hearth of the furnace was filled with liquid steel this steel was tapped into a ladle, leaving a sump of molten steel on the bottom of the furnace. Melting was then continued. The steel in the ladle had a composition of

| | |
|---|---|
| C | 0.25 |
| Mn | 0.55 |
| Si | 0.30 |
| P | 0.035 |
| S | 0.035 | and a temperature of 1580° C. This steel was teemed into ingots used for hot rolling purposes.

OPERATING A SHAFT TYPE FURNACE FOR DIRECT STEELMAKING FROM PREPARED ORE, PARTICULARLY PELLETS

By means of the conveyor scrap which passes over a conical rotatable bell is first introduced into a shaft type furnace and then the scrap is heated by the available oxygen gas or oxygen oil burners and melted. As soon as the first quantity of liquid steel has formed, the prepared ore, if possible pellets, is charged into the shaft type furnace in the same manner as in the case of scrap. In this moment hydrogen is introduced through special tubes which are arranged near the oxygen fuel burners.

If any oxygen should have remained unburnt in the vicinity of the burners, it will be burnt immediately together with the hydrogen. The combination gases of the burners will be composed of CO and other gases. This CO together with the introduced H will start the reduction and complete it. In the course of the operation the shaft type furnace will be filled more and more with pellets. The hot reducing gases will slowly cool down when ascending in the shaft, whereby the CO is transformed into $CO_2$ and thus contributes to the indirect reduction of the ore. The waste gases will mostly consist of $CO_2$ and water vapor.

The quantity of hydrogen required for the ore to be used will depend on the stoichiometrical calculations. Of course it will be necessary to consider the efficiency of the furnace.

According to the composition of the used or slag-forming constituents in the form of lime, limestone, fluorspar and other additions are to be added when charging pellets in order to carry through the metallurgical operations necessary for the removal of the detrimental accompanying elements.

The kind and quantity of the additions are dependent on the composition of the ore.

Finishing of the liquid steel before its run-off and the run-off of the steel or the slag is to be accomplished in the same manner as in the case of the scrap melting furnace.

*Example II.—Direct steel making from pellets*

The furnace was charged with scrap as described in Example I, but after melting of a steel sump no further scrap but pellets consisting of an iron ore of the following composition was introduced into the furnace:

| | Percent |
|---|---|
| Fe in the form of $Fe_2O_3$ | 58–62 |
| $SiO_2$ | 8 |
| $Al_2O_3$ | 1 |

The pellets had a diameter of 8–12 mm. At the same time hydrogen was introduced through special tubes arranged near the oxygen fuel burners. The rate of gas feeding was 5.0 cubic meters per min.

The burners were fed with natural gas and oxygen in a ratio of natural gas to oxygen of 1 to 1.2.

The hydrogen consumption was about 300 m.³, of natural gas 1300 m.³ and of oxygen 1500 m.³ per hour. After reducing the ore on the hearth of the furnace was filled with molten steel slag forming means were introduced (150 kg. limestone and 20 kg. fluorspar). After forming a liquid slag in 10 minutes and after treating the steel bath under this slag for 20 minutes the steel was tapped into a ladle and deoxidized with 10 kg. Mn/ton steel and 8 kg. FeSi/ton steel with 80% Si. The steel produced had a composition of 0.10–0.20 C, 0.50 Mn, 0.20 Si, 0.035 P, 0.035 S and a temperature of 1570° C.

I claim:

1. Furnace for melting metal which comprises a furnace chamber sealed from the ambient atmosphere, sealable inlet means for charging the furnace with metal, outlet means for drawing-off the products of the melting, and burner means pivotally mounted in the wall of said furnace chamber directed into the burner chamber for introducing oxygen and fuel as the sole heat generating source for the furnace, said burner means being provided with oxygen fuel channels outwardly diverging at their ends facing the interior of the furnace chamber.

2. Furnace according to claim 1 wherein said channels outwardly diverge at their ends facing the interior of the furnace chamber at an angle of about 20° with respect to the longitudinal axis of the burner means.

References Cited by the Examiner

UNITED STATES PATENTS

| | | | |
|---|---|---|---|
| 1,515,906 | 11/1924 | Steel | 75—40 |
| 1,939,874 | 12/1933 | Brassert | 75—46 |

FOREIGN PATENTS

| | | |
|---|---|---|
| 6,016 | 9/1850 | France. |
| 444,809 | 10/1912 | France. |
| 22,688 | 1904 | Great Britain. |

OTHER REFERENCES

Blast Furnace Proceedings, AIME, volume 19, 1960, pages 238–278.

Kurzinski, E. F.: "Oxygen and Steelmaking Processes," Iron and Steel Engineer, February 1960, pages 65–75.

Making, Shaping and Treating of Steel, 7th Edition, published by U.S. Steel Corporation, Pittsburgh, Pa., 1957, page 223.

DAVID L. RECK, *Primary Examiner.*